(12) United States Patent
Arquero et al.

(10) Patent No.: US 10,889,297 B2
(45) Date of Patent: Jan. 12, 2021

(54) DETERMINING A SAFE DRIVING SPEED FOR A VEHICLE

(71) Applicant: INTERNATIONAL BUSINESS MACHINES CORPORATION, Armonk, NY (US)

(72) Inventors: Gregg M. Arquero, Poughkeepsie, NY (US); Steven N. Burchfield, Woodstock, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 433 days.

(21) Appl. No.: 15/783,046

(22) Filed: Oct. 13, 2017

(65) Prior Publication Data

US 2019/0111923 A1   Apr. 18, 2019

(51) Int. Cl.
| | |
|---|---|
| *B60W 30/14* | (2006.01) |
| *G08G 1/052* | (2006.01) |
| *G08G 1/01* | (2006.01) |
| *G08G 1/0967* | (2006.01) |
| *G06Q 50/26* | (2012.01) |
| *G06Q 40/08* | (2012.01) |

(52) U.S. Cl.
CPC .......... *B60W 30/146* (2013.01); *G08G 1/012* (2013.01); *G08G 1/0112* (2013.01); *G08G 1/0129* (2013.01); *G08G 1/052* (2013.01); *G08G 1/096708* (2013.01); *G08G 1/096775* (2013.01); *B60W 2554/00* (2020.02); *B60W 2556/45* (2020.02); *B60W 2556/50* (2020.02); *B60W 2720/12* (2013.01); *G06Q 40/08* (2013.01); *G06Q 50/265* (2013.01)

(58) Field of Classification Search
CPC ....... B60W 2554/4042; B60W 30/146; B60W 30/143; B60W 50/14
See application file for complete search history.

(56) References Cited

U.S. PATENT DOCUMENTS

| | | | |
|---|---|---|---|
| 5,270,708 A | 12/1993 | Kamishima | |
| 8,248,223 B2 * | 8/2012 | Periwal | B60Q 9/00 180/170 |

(Continued)

FOREIGN PATENT DOCUMENTS

| | | |
|---|---|---|
| CN | 102034009 A | 4/2011 |
| CN | 201876462 U | 6/2011 |
| DE | 4414657 A1 | 11/1995 |

*Primary Examiner* — Kenneth J Malkowski
(74) *Attorney, Agent, or Firm* — Cantor Colburn LLP; Teddi Maranzano

(57) ABSTRACT

Embodiments include methods, systems and computer program products for determining a safe driving speed for a vehicle. Aspects include obtaining a location and a direction of travel of the vehicle, obtaining one or more operating conditions of the vehicle, and obtaining historical accident data that corresponds to the location of the vehicle under operating conditions that are similar to the one or more conditions of the vehicle. Aspects also include analyzing, by a processor, the historical accident data to identify the safe driving speed for the vehicle, wherein the safe driving speed is determined to be a maximum speed that is associated with maximum acceptable risk of an accident and causing an indication of the safe driving speed to be displayed to an operator of the vehicle.

14 Claims, 7 Drawing Sheets

(56) References Cited

U.S. PATENT DOCUMENTS

| | | |
|---|---|---|
| 9,937,923 B2 | 4/2018 | Custer et al. |
| 10,661,797 B2 | 5/2020 | Chack et al. |
| 2013/0245945 A1* | 9/2013 | Morita ............. G08G 1/096716 701/533 |
| 2015/0197248 A1 | 7/2015 | Breed et al. |
| 2016/0009279 A1 | 1/2016 | Jimaa et al. |
| 2016/0047666 A1 | 2/2016 | Fuchs |
| 2016/0086487 A1* | 3/2016 | Abraham ......... G08G 1/096716 340/905 |
| 2016/0091323 A1 | 3/2016 | MacGougan et al. |
| 2016/0189540 A1 | 6/2016 | Fowe et al. |

\* cited by examiner

US 10,889,297 B2

DETERMINING A SAFE DRIVING SPEED FOR A VEHICLE

BACKGROUND

The present disclosure relates to operating a vehicle and more specifically, to methods, systems and computer program products for determining a safe speed for driving a vehicle.

In general, speed limits are provided for large sections of roads, these speed limits reflect a maximum allowable speed for traveling on the road. These speed limits do not account for variances in the weather conditions, the time of day, or for increased accident risk of specific portions of the road. Currently, there is no consistent way for an operator of a vehicle to determine at what speed, for all sections of a road, an accident is likely to occur. Rather, operators often have to rely on instinct and past experience in the immediate area to have an idea at which speed it is safe to travel.

SUMMARY

In accordance with an embodiment, a method for determining a safe driving speed for a vehicle is provided. The method includes obtaining a location and a direction of travel of the vehicle, obtaining one or more operating conditions of the vehicle, and obtaining historical accident data that corresponds to the location of the vehicle under operating conditions that are similar to the one or more conditions of the vehicle. The method also includes analyzing the historical accident data to identify the safe driving speed for the vehicle, wherein the safe driving speed is determined to be a maximum speed that is associated with maximum acceptable risk of an accident. The method further includes causing an indication of the safe driving speed to be displayed to an operator of the vehicle.

In accordance with another embodiment, a system for determining a safe driving speed for a vehicle is provided. The mobile device includes a processor in communication with one or more types of memory. The processor is configured to obtain a location and a direction of travel of the vehicle, obtain one or more operating conditions of the vehicle, and obtain historical accident data that corresponds to the location of the vehicle under operating conditions that are similar to the one or more conditions of the vehicle. The processor is further configured to analyze the historical accident data to identify the safe driving speed for the vehicle, wherein the safe driving speed is determined to be a maximum speed that is associated with maximum acceptable risk of an accident. The processor is also configured to cause an indication of the safe driving speed to be displayed to an operator of the vehicle.

In accordance with a further embodiment, a computer program product for determining a safe driving speed for a vehicle includes a non-transitory storage medium readable by a processing circuit and storing instructions for execution by the processing circuit for performing a method. The method includes obtaining a location and a direction of travel of the vehicle, obtaining one or more operating conditions of the vehicle, and obtaining historical accident data that corresponds to the location of the vehicle under operating conditions that are similar to the one or more conditions of the vehicle. The method also includes analyzing the historical accident data to identify the safe driving speed for the vehicle, wherein the safe driving speed is determined to be a maximum speed that is associated with maximum acceptable risk of an accident. The method further includes causing an indication of the safe driving speed to be displayed to an operator of the vehicle.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
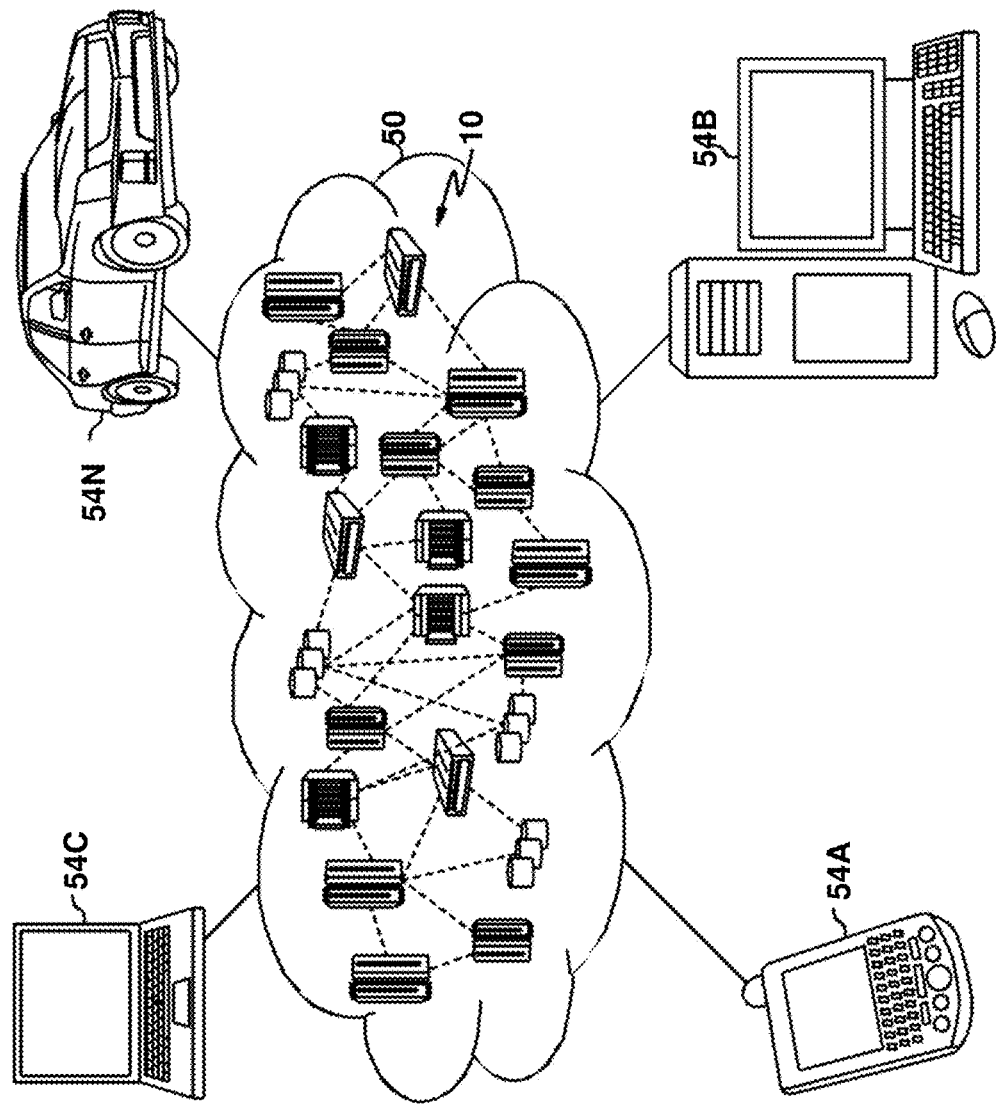
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
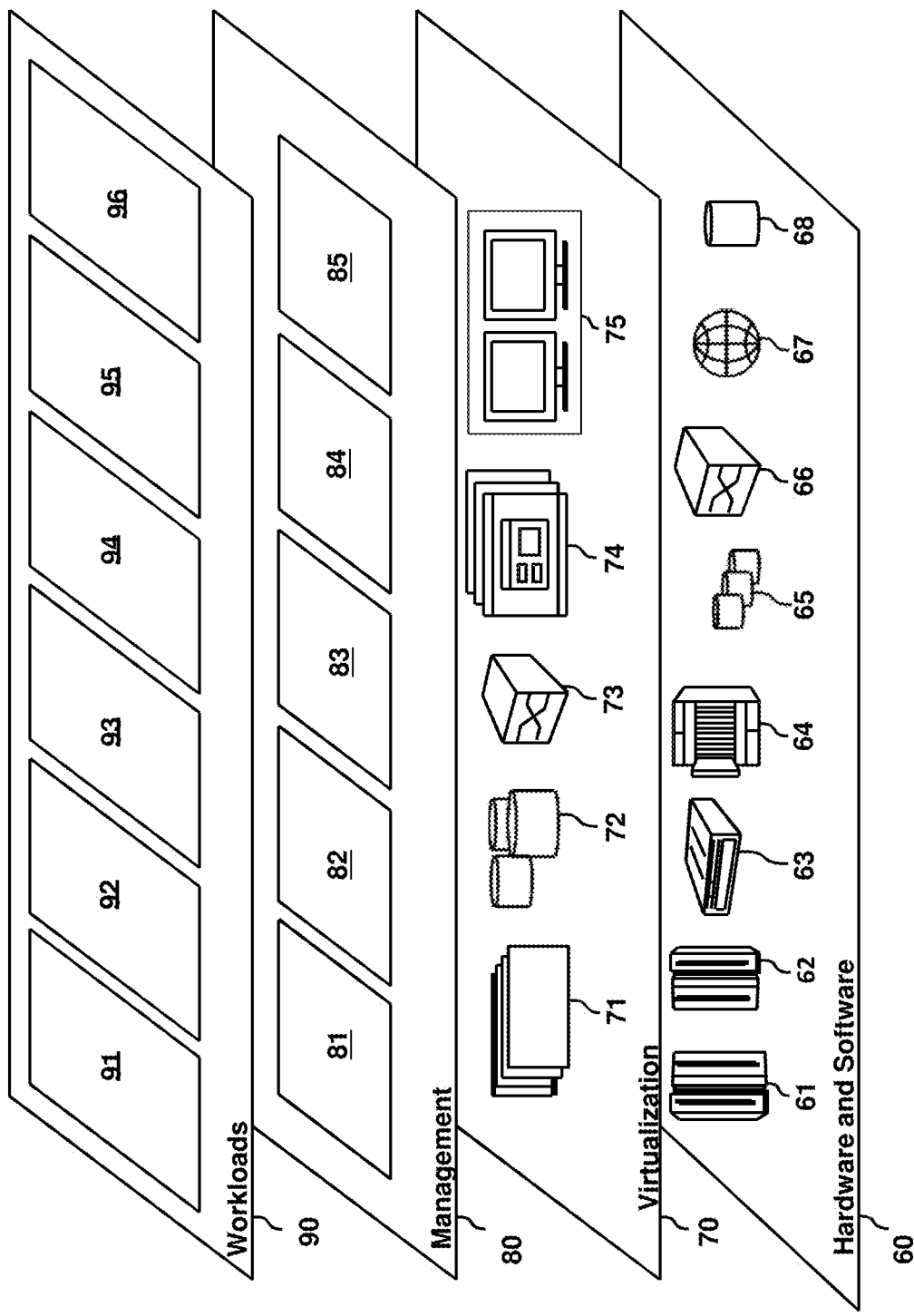
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analysis of accident data 96.

Figure 3:
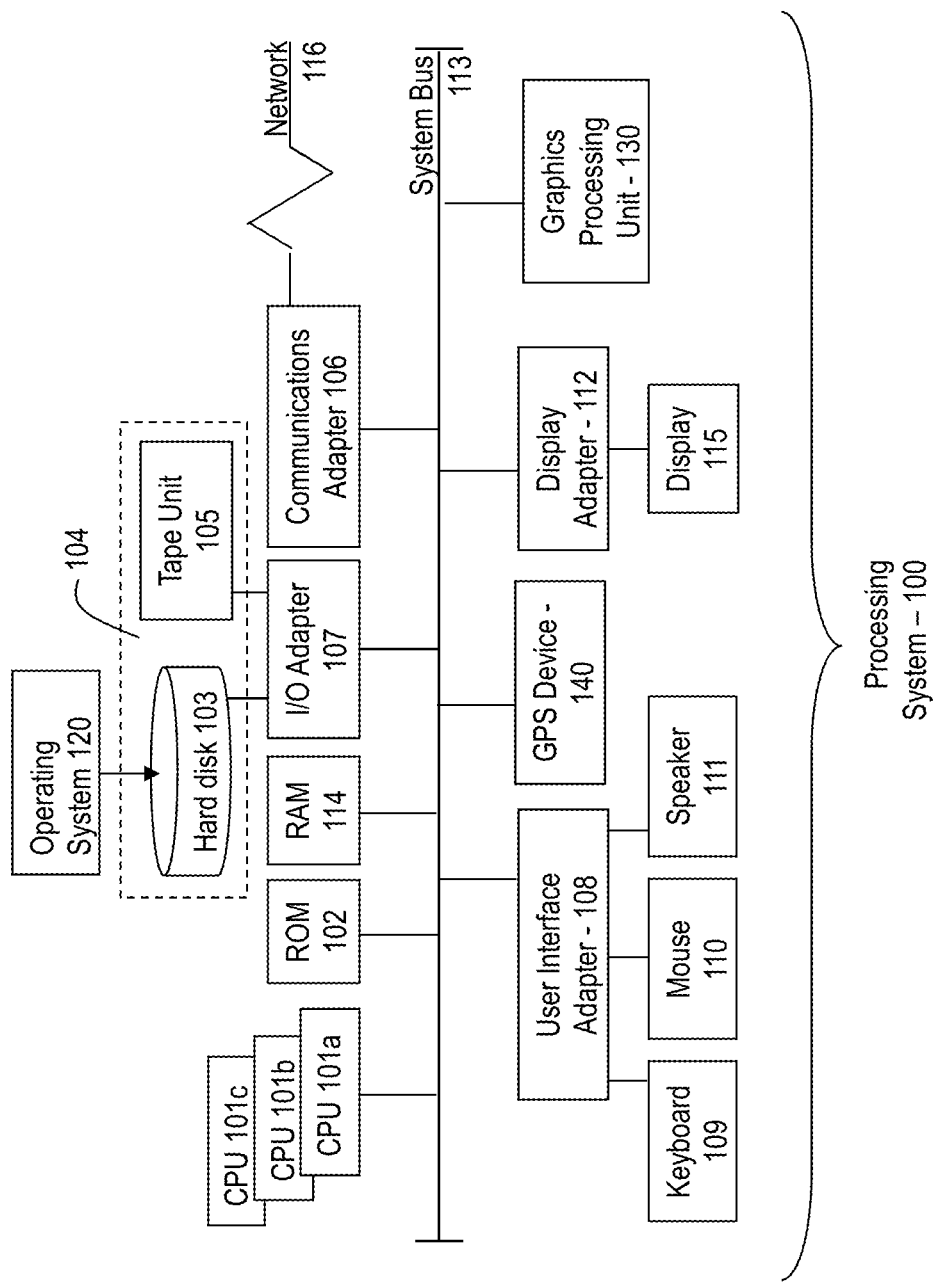
FIG. 3 is a block diagram of an exemplary computer system capable of implementing one or more embodiments of the present invention.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101).

In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 3 further depicts an input/output (I/O) adapter 107, a network adapter 106, and a GPS device 140 coupled to the system bus 113. I/O adapter 107 may be a small computer system interface (SCSI) adapter that communicates with flash storage, a hard disk 103 and/or tape storage drive 105 or any other similar component. I/O adapter 107, flash storage, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Turning now to an overview of technologies that are more specifically relevant to aspects of the invention, which are related to determining a safe driving speed for a vehicle. In exemplary embodiments, historical accident data is obtained that includes information regarding accidents that occurred on a portion of a road that the vehicle is on. From this accident data, and based on the current driving conditions, a safe speed at which drivers can drive such that an accident is unlikely to occur is calculated. In exemplary embodiments, the historical accident data includes the location of the accidents that occurred, the speed at which the accident occurred, the time of day that the accident occurred, the day of the week that the accident occurred, the weather at the time that the accident occurred, the traffic density that the accident occurred, and the like.

Figure 4:
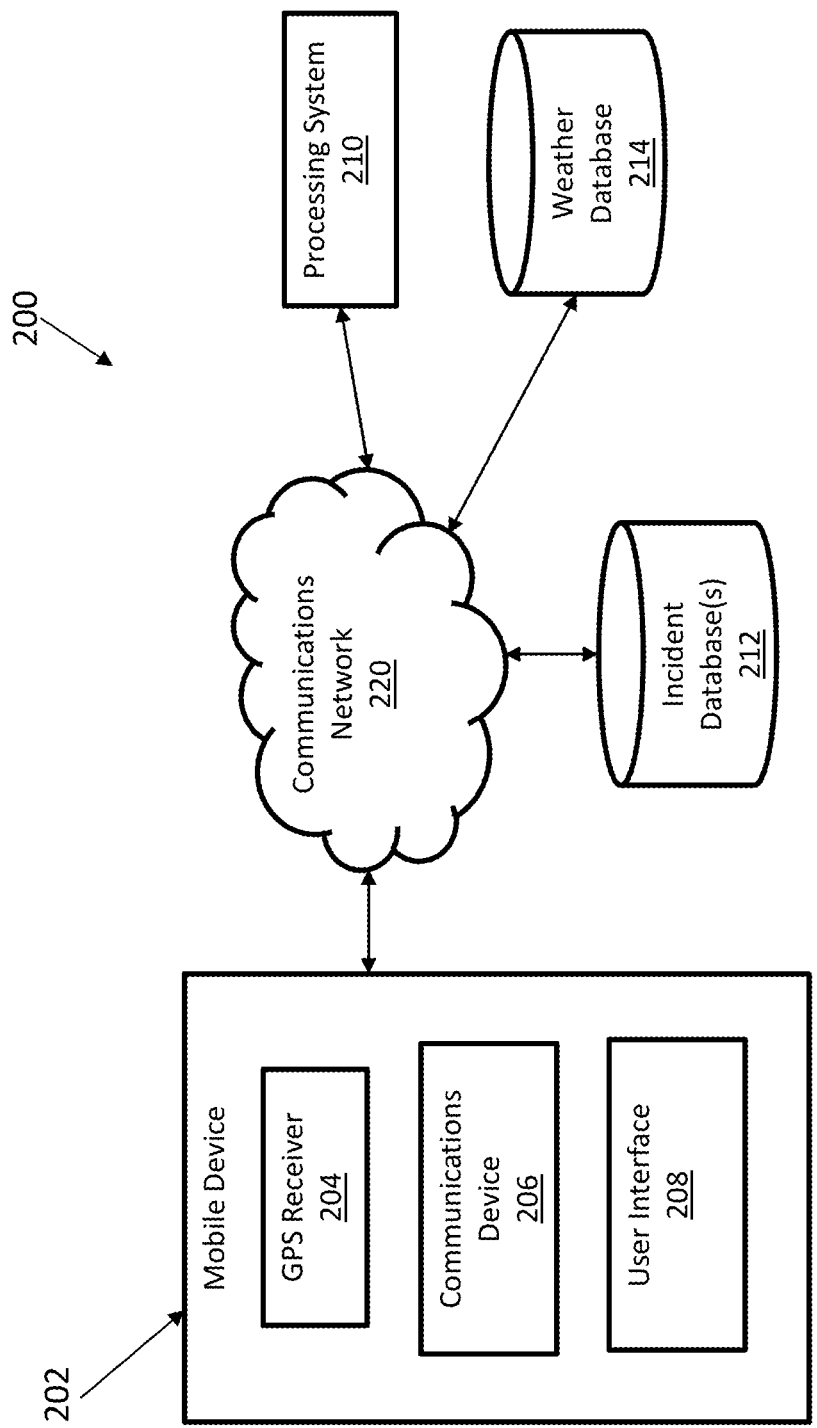
FIG. 4 is a block diagram of a system for determining a safe driving speed for a vehicle in accordance with an exemplary embodiment.

Referring now to FIG. 4, a system 200 for determining a safe driving speed for a vehicle is shown. As illustrated the system 200 includes a mobile device 202 that includes a GPS receiver 204, a communications device 206 and a user interface 208. In exemplary embodiments, the mobile device 202 can be a vehicle or it may be a smartphone disposed within a vehicle. The mobile device 202 is configured to communicate with one or more of a processing system 210, an incident database 212, and a weather database 214 via a communications network 220. The processing system 210, may be a processing system such as the one shown in FIG. 3, and the processing system 210 is configured to communicate with one or more of the incident database 212 and the weather database 214 via a communications network 220. The communications network 220 can include both private and public communications networks such as cellular telephone networks, and the Internet.

In exemplary embodiments, the safe driving speed calculation can be performed by the mobile device 202 or by the processing system 210 based on data obtained from the mobile device 202, the weather database 214 and the incident database(s) 212. In exemplary embodiments, the incident database(s) 212 can include data obtained from police records and/or insurance records. The incident database(s) 212 can include a location of the accident, a speed at which the driver was traveling, a date and time of day of the accident and the weather conditions at the time of the accident. In exemplary embodiments, the incident database(s) 212 can include data from the past five years from a current date.

Figure 5:
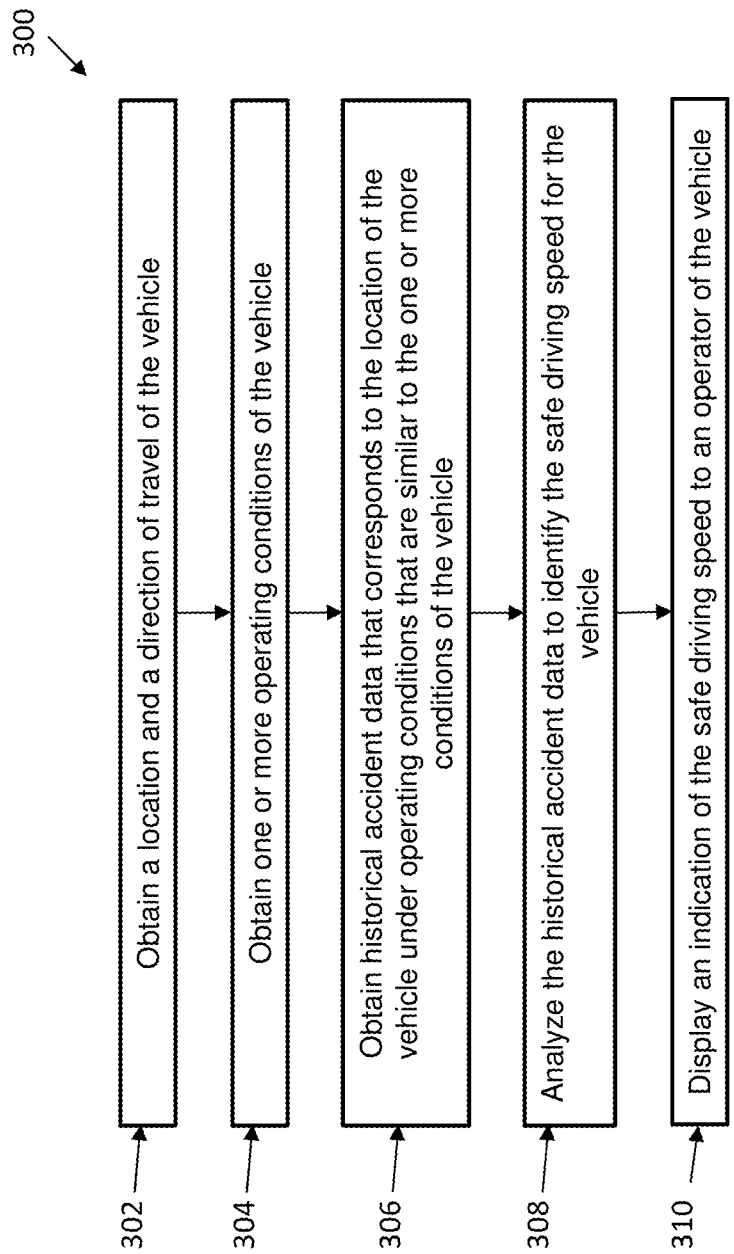
FIG. 5 is a flow diagram of method for determining a safe driving speed for a vehicle in accordance with an exemplary embodiment.

Referring now to FIG. 5, a flow diagram of a method 300 determining a safe driving speed for a vehicle in accordance with an exemplary embodiment. As shown at block 302, the method 300 includes obtaining a location and a direction of travel of the vehicle. Next, as shown at block 304, the method 300 includes obtaining one or more operating conditions of the vehicle. In exemplary embodiments, the one or more operating conditions of the vehicle include a weather condition of the location and a time of day at the location of the vehicle. The method 300 also includes obtaining historical accident data that corresponds to the location of the vehicle under operating conditions that are similar to the one or more conditions of the vehicle, as shown at block 306. In exemplary embodiments, the historical accident data is obtained from a vehicle accident database that includes accident data from one or more of an insurance database and a police record database. Next, as shown at block 308, the method 300 includes analyzing the historical accident data to identify the safe driving speed for the vehicle. In one embodiment, analyzing the historical accident data to identify the safe driving speed for the vehicle includes creating a graph of the accident data and identifying an inflection point in the graph as the safe driving speed. Next, as shown at block 310, the method 300 includes displaying an indication of the safe driving speed to an operator of the vehicle. In exemplary embodiments, the safe driving speed can be displayed on a heads-up display of a vehicle, a driver information panel of the vehicle, on a display of a smartphone or the like.

In exemplary embodiments, the method can also include generating an alert based on a determination that a current speed of the vehicle is greater than the safe driving speed. For example, the alert can be an audio alert, such as a beeping sound, that is used to indicate that the current speed of the vehicle is greater than the safe driving speed. The volume and/or frequency of this alert may increase as the difference between the current speed and the safe driving speed increases.

In exemplary embodiments, the method can also include limiting a current speed of the vehicle to the safe driving speed. For example, the vehicle may receive the safe driving speed and may electronically limit the operating speed of the vehicle to the safe driving speed. In addition, the vehicle may be configured to automatically adjust a speed of a cruise control of the vehicle to be equal to the safe driving speed.

Figure 6:
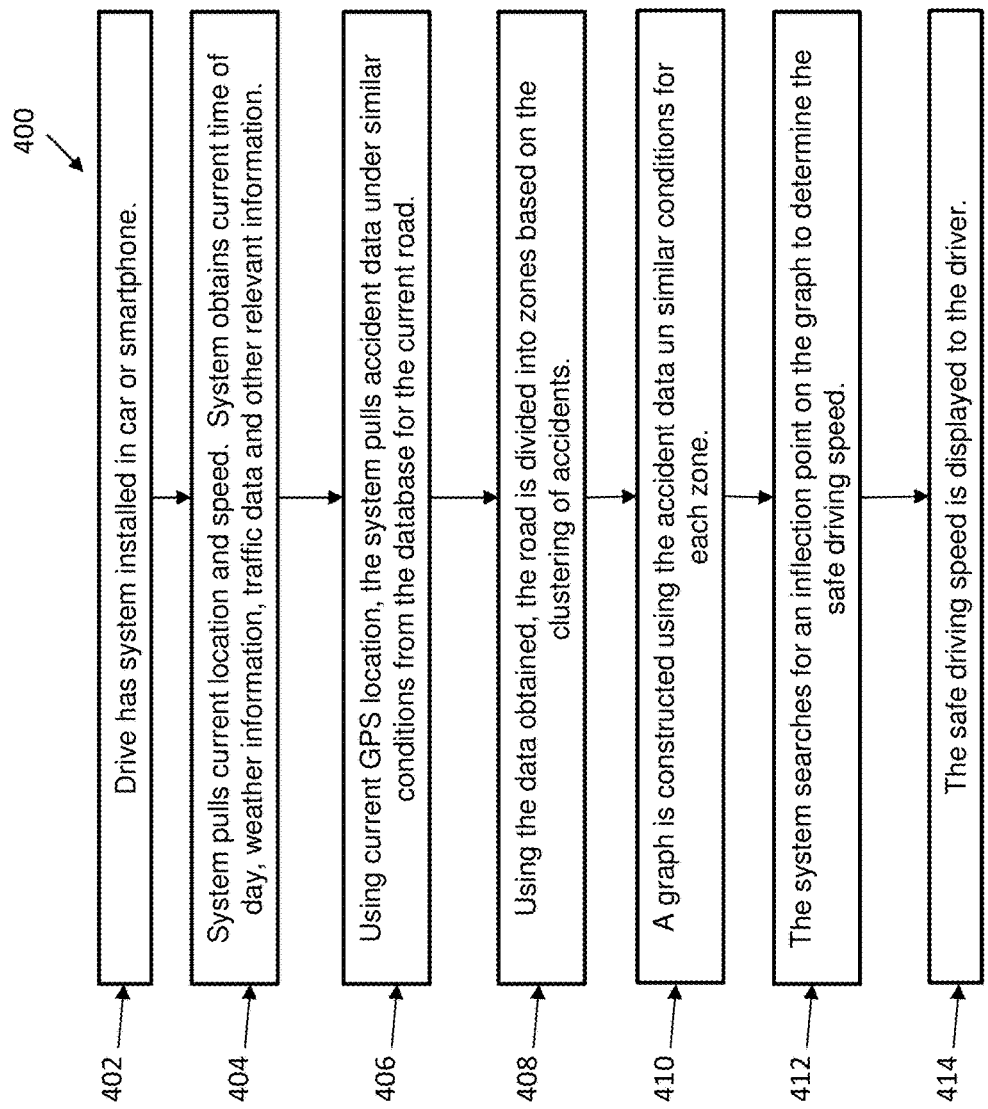
FIG. 6 is a flow diagram of another method for determining a safe driving speed for a vehicle in accordance with an exemplary embodiment.
Figure 7:
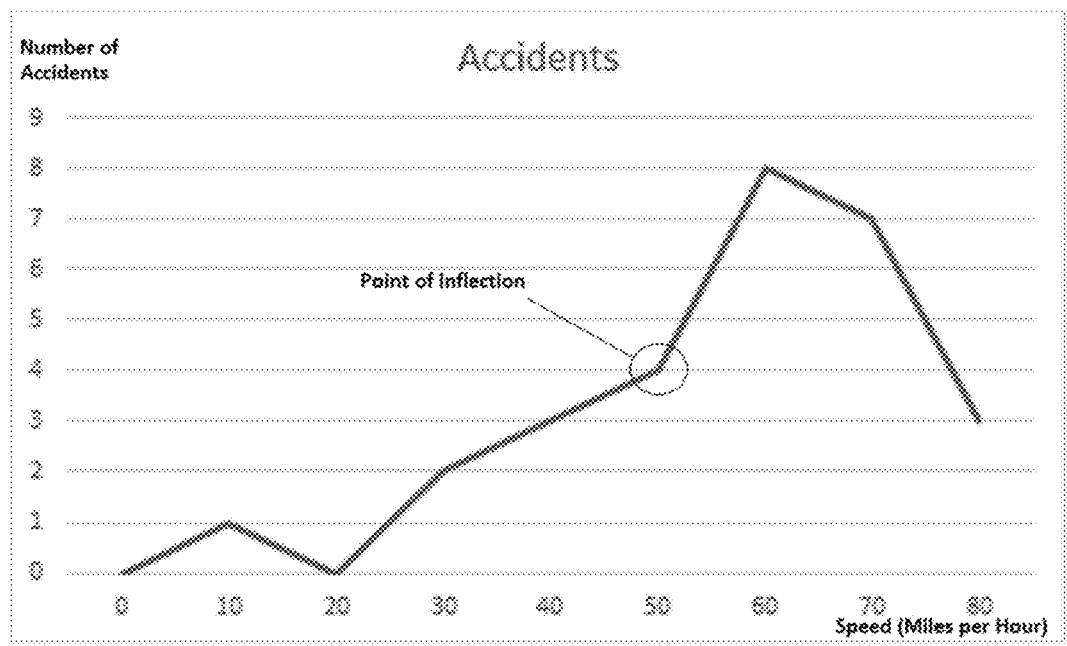
FIG. 7 is a graph illustrating a normalized number of accidents and the speed at which the accident occurred for a segment of a road in accordance with an exemplary embodiment.
Figure 8:
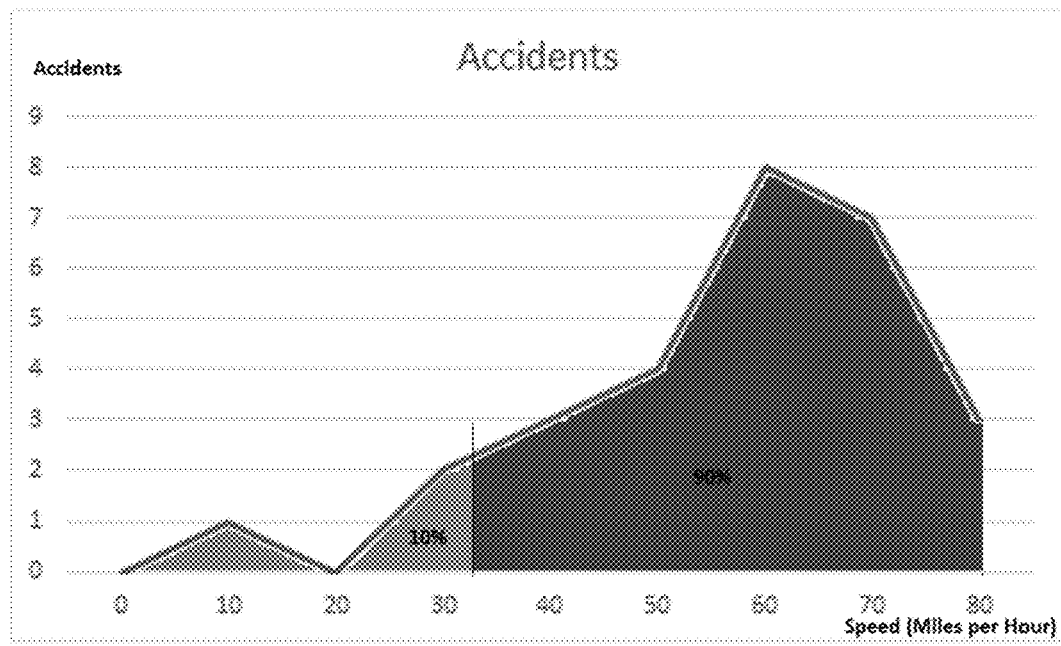
FIG. 8 is a graph illustrating a normalized number of accidents and the speed at which the accident occurred for a segment of a road in accordance with an exemplary embodiment.

Referring now to FIG. 6, a flow diagram of a method 400 determining a safe driving speed for a vehicle in accordance with an exemplary embodiment. As shown at block 402, the method 400 includes installing a safe speed determination system in their vehicle or on their smartphone. Next, as shown at block 404, the method 400 includes the safe speed determination system obtaining a current location and speed of the vehicle as well as the time of day, weather information, traffic information and other relevant information. The method 500 includes obtaining accident data that was reported under similar conditions from one or more databases, as shown at block 406. Next, as shown at block 408, the method 400 includes diving the road into zones based on a clustering of accidents reflected in the obtained data. A graph is constructed using the accident data for each zone of the road, as shown at block 410. In one embodiment, the graph can be a graph as shown in FIGS. 7 and 8, which illustrate a normalized number of accidents and the speed at which the accident occurred. The normalized number of accidents for each speed can be calculated by dividing the number of accidents at X mph by the number of cars driving at X mph. Next, as shown at block 412, the method 400 includes identifying an inflection point on the graph to determine the safe driving speed. As shown at block 414, the method 400 includes displaying the safe driving speed to the driver of the vehicle.

In another embodiment, a percentage cutoff rather than an inflection point may be used to identifying the safe driving speed. For example, the safe driving speed may be determined to be the speed at which more than thirty-three percent of the cars traveling at a given speed were involved in an accident, as shown FIG. 8.

In one example, a model is constructed that includes a normalized number of drivers in a given speed zone that had a traffic accident when going x miles per hour, where x is the horizontal axis of the curve. The normalized number of accidents for each speed can be calculated by dividing the number of accidents at X mph by the number of cars driving at X mph. From the model, a safe driving speed range can be calculated for the driver given weather condition, the day of the week, and time of the day. The model can be constructed on demand and will change when the driver approaches a new speed zone in which the speed zone is higher or lower than the current speed zone. From the given range, the upper bound is identified as the safe driving speed on the current road with a reduced chance of having a traffic accident for the given weather conditions, the day of the week, and time of day.

In one example, a driver is approaching a road in which the speed limit is 55 MPH at one in the afternoon on a Monday. The safe driving speed system will identify the driver's location via GPS and will identify that current weather is sunny for that location. Pulling traffic accident data for that zone, a model is constructed, 2/100 people have had an accident going less than 55 MPH, 4/100 people have had an accident going between 56-60 MPH, 8/100 people have had an accident going between 61-64 MPH, 12/100 people have had an accident going between 65-68 MPH, and 42/100 people have had an accident going greater than 69 MPH in similar weather conditions, day of the week, and time of day. The safe driving speed system will identify the least risky speed range as less than 61 MPH and will return 61 at the 'safe' speed for the current speed zone.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method determining a safe driving speed for a vehicle, the computer implemented method comprises:
   obtaining a location and a direction of travel of the vehicle;
   obtaining one or more operating conditions of the vehicle;
   obtaining historical accident data that corresponds to the location of the vehicle under operating conditions that are similar to the one or more conditions of the vehicle;
   analyzing, by a processor, the historical accident data to identify the safe driving speed for the vehicle, wherein the safe driving speed is determined to be a maximum speed that is associated with maximum acceptable risk of an accident;
   causing an indication of the safe driving speed to be displayed to an operator of the vehicle; and
   limiting a current speed of the vehicle to the safe driving speed,
   wherein analyzing the historical accident data to identify the safe driving speed for the vehicle includes creating a graph of a number of accidents as a function of vehicle speed and identifying an inflection point in the graph as the safe driving speed, the inflection point being a point at which a slope of the graph changes.

2. The computer implemented method of claim 1, further comprising generating an alert based on a determination that a current speed of the vehicle is greater than the safe driving speed.

3. The computer implemented method of claim 1, further comprising adjusting a speed of a cruise control of the vehicle to be equal to the safe driving speed.

4. The computer implemented method of claim 1, wherein the one or more operating conditions of the vehicle comprise a weather condition of the location and a time of day at the location.

5. The computer implemented method of claim 1, wherein the historical accident data is obtained from a vehicle accident database that includes accident data from one or more of an insurance database and a police record database.

6. A computer program product for determining a safe driving speed for a vehicle, the computer program product comprising:
   a storage medium readable by a processing circuit and storing instructions for execution by the processing circuit for performing a method comprising:
      obtaining a location and a direction of travel of the vehicle;
      obtaining one or more operating conditions of the vehicle;
      obtaining historical accident data that corresponds to the location of the vehicle under operating conditions that are similar to the one or more conditions of the vehicle;
      analyzing, by a processor, the historical accident data to identify the safe driving speed for the vehicle, wherein the safe driving speed is determined to be a maximum speed that is associated with maximum acceptable risk of an accident;
      causing an indication of the safe driving speed to be displayed to an operator of the vehicle; and
      limiting a current speed of the vehicle to the safe driving speed,
      wherein analyzing the historical accident data to identify the safe driving speed for the vehicle includes creating a graph of a number of accidents as a function of vehicle speed and identifying an inflection point in the graph as the safe driving speed, the inflection point being a point at which a slope of the graph changes.

7. The computer program product of claim 6, further comprising generating an alert based on a determination that a current speed of the vehicle is greater than the safe driving speed.

8. The computer program product of claim 6, further comprising adjusting a speed of a cruise control of the vehicle to be equal to the safe driving speed.

9. The computer program product of claim 6, wherein the one or more operating conditions of the vehicle comprise a weather condition of the location and a time of day at the location.

10. The computer program product of claim 6, wherein the historical accident data is obtained from a vehicle accident database that includes accident data from one or more of an insurance database and a police record database.

11. A system configured to determine a safe driving speed for a vehicle, the system comprising a processor in communication with one or more types of memory, the processor configured to:
   obtain a location and a direction of travel of the vehicle;
   obtain one or more operating conditions of the vehicle;
   obtain historical accident data that corresponds to the location of the vehicle under operating conditions that are similar to the one or more conditions of the vehicle;
   analyze, the historical accident data to identify the safe driving speed for the vehicle, wherein the safe driving speed is determined to be a maximum speed that is associated with maximum acceptable risk of an accident;
   display an indication of the safe driving speed to an operator of the vehicle; and
   limit a current speed of the vehicle to the safe driving speed,
   wherein analyzing the historical accident data to identify the safe driving speed for the vehicle includes creating a graph of a number of accidents as a function of vehicle speed and identifying an inflection point in the graph as the safe driving speed, the inflection point being a point at which a slope of the graph changes.

12. The system of claim 11, wherein the processor is further configured to generate an alert based on a determination that a current speed of the vehicle is greater than the safe driving speed.

13. The system of claim 11, wherein the processor is further configured to adjust a speed of a cruise control of the vehicle to be equal to the safe driving speed.

14. The system of claim 11, wherein the one or more operating conditions of the vehicle comprise a weather condition of the location and a time of day at the location.

* * * * *